United States Patent
Huang et al.

(10) Patent No.: US 8,489,801 B2
(45) Date of Patent: Jul. 16, 2013

(54) NON-VOLATILE MEMORY WITH HYBRID INDEX TAG ARRAY

(76) Inventors: Henry F. Huang, Apple Valley, MN (US); Yiran Chen, Eden Prairie, MN (US)

( * ) Notice: Subject to any disclaimer, the term of this patent is extended or adjusted under 35 U.S.C. 154(b) by 702 days.

(21) Appl. No.: 12/397,569

(22) Filed: Mar. 4, 2009

(65) Prior Publication Data

US 2010/0228912 A1   Sep. 9, 2010

(51) Int. Cl.
*G06F 12/08*   (2006.01)

(52) U.S. Cl.
USPC ............ 711/101; 711/103; 711/108; 711/207

(58) Field of Classification Search
None
See application file for complete search history.

(56) References Cited

U.S. PATENT DOCUMENTS

| | | | |
|---|---|---|---|
| 6,304,477 B1 | 10/2001 | Naji | |
| 6,400,593 B1 | 6/2002 | Lien et al. | |
| 6,452,823 B1 * | 9/2002 | Naji | 365/50 |
| 6,567,307 B1 | 5/2003 | Estakhri | |
| 6,763,424 B2 | 7/2004 | Conley | |
| 6,823,434 B1 | 11/2004 | Hannum et al. | |
| 7,009,877 B1 | 3/2006 | Huai | |
| 7,098,494 B2 | 8/2006 | Pakala | |
| 7,187,577 B1 | 3/2007 | Wang | |
| 7,224,601 B2 | 5/2007 | Panchula | |
| 7,272,034 B1 | 9/2007 | Chen | |
| 7,272,035 B1 | 9/2007 | Chen | |
| 7,282,755 B2 | 10/2007 | Pakala | |
| 7,286,394 B2 | 10/2007 | Ooishi | |
| 7,286,395 B2 | 10/2007 | Chen | |
| 7,289,356 B2 | 10/2007 | Diao | |
| 7,345,912 B2 | 3/2008 | Luo | |
| 7,379,327 B2 | 5/2008 | Chen | |
| 7,395,404 B2 | 7/2008 | Gorobets et al. | |
| 7,502,249 B1 | 3/2009 | Ding | |
| 7,515,457 B2 | 4/2009 | Chen | |
| 7,711,923 B2 * | 5/2010 | Rogers et al. | 711/206 |
| 8,135,763 B1 * | 3/2012 | Compton et al. | 707/822 |
| 2005/0177679 A1 | 8/2005 | Alva et al. | |
| 2005/0254295 A1 | 11/2005 | Nazarian | |
| 2006/0044881 A1 * | 3/2006 | Tran et al. | 365/189.06 |
| 2006/0256610 A1 | 11/2006 | Qureshi et al. | |
| 2007/0152344 A1 | 7/2007 | Zingher et al. | |

(Continued)

OTHER PUBLICATIONS

Kostas Pagiamtzis and Ali Sheikholeslami, "Content-Addressable Memory (CAM) Circuits and Architectures: A Tutorial and Survey," IEEE Journal of Solid-State Circuits, Mar. 2006, pp. 712-727, vol. 41, No. 3, IEEE.

(Continued)

*Primary Examiner* — Gary Portka
(74) *Attorney, Agent, or Firm* — Hall Estill Attorneys at Law

(57) ABSTRACT

Various embodiments of the present invention are generally directed to an apparatus and associated method for a non-volatile memory with a hybrid index tag array. In accordance with some embodiments, a memory device has a word memory array formed of non-volatile resistive sense memory (RSM) cells, a first index array formed of volatile content addressable memory (CAM) cells, and a second index array formed of non-volatile RSM cells. The memory device is configured to output word data from the word memory array during a data retrieval operation when input request data matches tag data stored in the first index array, and to copy tag data stored in the second index array to the first index array during a device reinitialization operation.

19 Claims, 5 Drawing Sheets

U.S. PATENT DOCUMENTS

| | | | |
|---|---|---|---|
| 2008/0056023 | A1 | 3/2008 | Lee et al. |
| 2008/0114930 | A1 | 5/2008 | Sanvido et al. |
| 2008/0266991 | A1 | 10/2008 | Lee et al. |
| 2008/0273380 | A1 | 11/2008 | Diao |
| 2008/0310213 | A1 | 12/2008 | Chen |
| 2008/0310219 | A1 | 12/2008 | Chen |
| 2009/0040855 | A1 | 2/2009 | Luo |
| 2009/0185410 | A1 | 7/2009 | Huai |
| 2009/0323384 | A1 | 12/2009 | Lam et al. |
| 2010/0095057 | A1* | 4/2010 | Li et al. .......................... 711/104 |

OTHER PUBLICATIONS

Fred Fishburn, Ralph Kauffman, Richard Lane, Terry McDaniel, Kevin Schofield, Scott Southwick, Ray Turi & Hongmei Want; "A highly manufacturable 110nm EDRAM process with Al2O3 stack MIM capacitor for cost effective high density, high speed, low voltage ASIC memory applications," 2003 Symposium on VLSI Technology Digest of Technical Papers, 2003, 75-76, Micron Technology, Boise, ID.

"CMOS-Compatible Process—A Deeper Look at eDRAM Cell Structure," NEC Electronics, 1995-2008, 1-3.

Amit Agarwal, Bipul C. Paul, Hamid Mahmoodi, Animesh Datta & Kaushik Roy, "A Process-Tolerant Cache Architecture for Improved Yield in Nanoscale Technologies," IEEE Transactions in Very Large Scale Integration (VLSI) Systems, Jan. 2005, 27-38, vol. 13, No. 1, US.

Doug Burger & Todd M. Austin, "The SimpleScalar Tool Set, Version 2.0," University of Wisconsin-Madison Computer Sciences Department Technical Report, Jun. 1997, 1-21, #1342, US.

* cited by examiner

NON-VOLATILE MEMORY WITH HYBRID INDEX TAG ARRAY

BACKGROUND

Data storage devices generally operate to store and retrieve data in a fast and efficient manner. A top level controller, such as a programmable processor (CPU), can utilize a hierarchical memory structure to manage data during such transfers with a main memory of the device, such as a semiconductor array of non-volatile memory cells, magnetic media, etc.

Such hierarchical memory structures can include cache, which generally comprises one or more relatively small memory blocks of relatively high speed memory operationally proximate the controller. The cache is generally used to maintain processing efficiencies of the controller at as high a level as possible by minimizing the wait times required to access the relatively slower main memory.

Multi-level caching can be used wherein multiple cache levels (e.g., L1, L2, L3) are successively defined along a pipeline memory structure of the device. If requested data is resident in a selected cache level, the data can be quickly retrieved for use by the controller (a cache hit), thereby eliminating the latency required to access the slower main memory to retrieve the requested data.

SUMMARY

Various embodiments of the present invention are generally directed to an apparatus and associated method for a non-volatile memory with a hybrid index tag array.

In accordance with some embodiments, a memory device comprises a word memory array formed of non-volatile resistive sense memory (RSM) cells, a first index array formed of volatile content addressable memory (CAM) cells, and a second index array formed of non-volatile RSM cells. The memory device is configured to output word data from the word memory array during a data retrieval operation when input request data matches tag data stored in the first index array, and to copy tag data stored in the second index array to the first index array during a device reinitialization operation.

In accordance with other embodiments, a method generally comprises providing a memory device with a word memory array formed of non-volatile resistive sense memory (RSM) cells, a first index array formed of volatile content addressable memory (CAM) cells, and a second index array formed of non-volatile RSM cells. Word data are output from the word memory array during a data retrieval operation when input request data matches tag data stored in the first index array. Tag data stored in the second index array are copied to the first index array during a device reinitialization operation.

These and various other features and advantages which characterize the various embodiments of the present invention can be understood in view of the following detailed discussion in view of the accompanying drawings.

DETAILED DESCRIPTION

Figure 1:
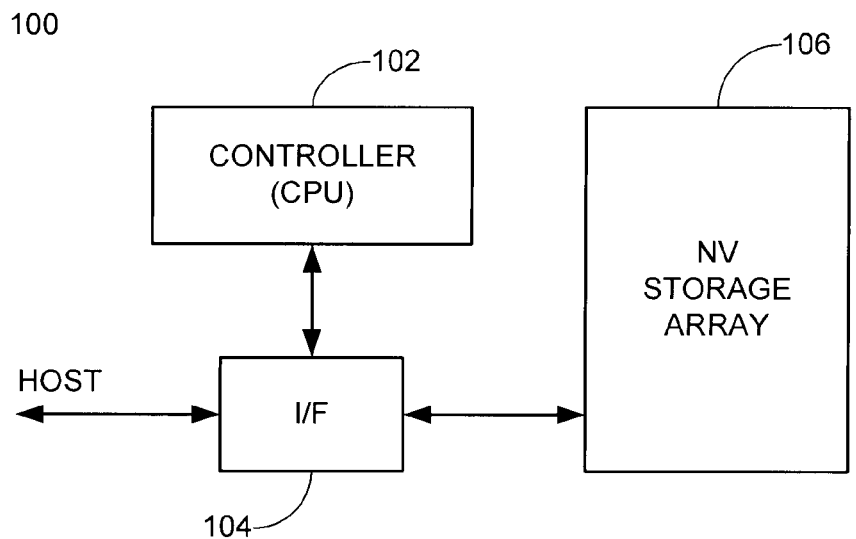
FIG. 1 provides a functional block representation of a data storage device in accordance with various embodiments of the present invention.

FIG. 1 provides a functional block representation of a data storage device 100 constructed and operated in accordance with various embodiments of the present invention. The device 100 includes a top level controller (CPU) 102, an interface (I/F) circuit 104 and a non-volatile (NV) data storage array 106. The I/F circuit 104 operates under the direction of the controller 102 to transfer data between the array 106 and a host device.

Figure 2:
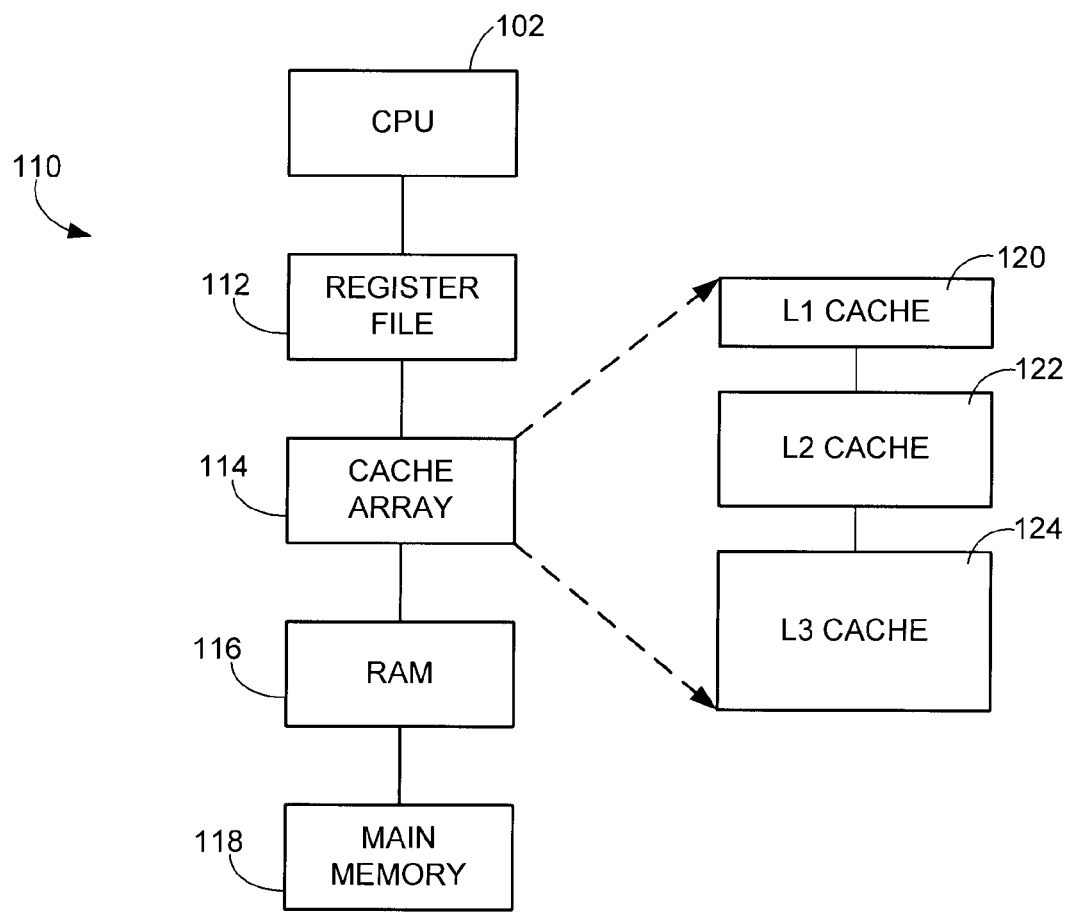
FIG. 2 sets forth a generalized representation of a memory hierarchy of the exemplary device of FIG. 1.

FIG. 2 generally illustrates an exemplary memory hierarchy for a data storage device such as the device 100 of FIG. 1. As explained in detail below, the memory hierarchy in FIG. 2 utilizes a non-volatile memory with a hybrid index tag array, constructed and operated in accordance with various embodiments of the present invention. This novel memory structure includes a word memory array formed of non-volatile resistive sense memory (RSM) cells, a first index array formed of volatile content addressable memory (CAM) cells, and a second index array formed of non-volatile RSM cells.

The memory structure is configured to output word data from the word memory array during a data retrieval operation when input request data matches tag data stored in the first index array, and to copy tag data stored in the second index array to the first index array during a device reinitialization operation. These and other features and advantages will be apparent in view of the following discussion.

The pipeline memory structure 110 in FIG. 2 incorporates various types of memories of different capacity and character. The memory hierarchy increases processing efficiencies of the CPU 102, provides substantially instant on/off operations, and reduces power consumption over other designs.

The pipeline structure 110 generally includes a register file 112, a cache array 114, direct access random access memory (RAM, such as volatile DRAM) 116, and non-volatile main memory 118. These respective elements can be variously mapped to the device 100 of FIG. 1; for example, the cache array can be incorporated on-chip with the controller 102 and/or located elsewhere, including but not limited to the I/F circuitry 104. The same is true for the other elements shown in FIG. 2.

A plurality of hierarchical cache levels are used for the cache array 114, such as first, second and third cache levels 120, 122 and 124 (L1, L2 and L3). Some embodiments use dual L1 caches, one to store instructions (L1-I) and another to store data (L1-D). Other arrangements can also be utilized.

During operation, data utilized by the CPU 102 are normally stored in local register files that are issued into the pipeline structure 110 for execution as needed. Generally, if the CPU 102 requests selected data during a data retrieval operation, if not available locally a methodical search process will be initiated whereby successive elements of the pipeline structure 110 will be checked to see of the selected data are resident therein.

For example, if L1 cache 120 does not have the selected data, the L2 cache 122 will be checked, and so on until the selected data is located and retrieved. Such retrieval may ultimately require an access operation upon the main memory 118. As used herein, a so-called cache hit involves retrieval of a copy of the data stored locally at a location along the pipeline structure 110 other than the main memory 118. Cache hits are generally desirable since retrieving the data from the main memory 118 can invoke a relatively long latency period, require bus negotiation and access, additional overhead processing by the CPU 102 to effect the transfer, disc rotational latencies, etc.

At this point it will be appreciated that the various aspects of the pipeline 110 can be constructed from volatile memory elements, such as static random access memory (SRAM), dynamic random access memory (DRAM), etc., or from non-volatile memory elements such as spin-torque transfer random access memory (STRAM), resistive random access memory (RRAM), etc.

Figure 3:
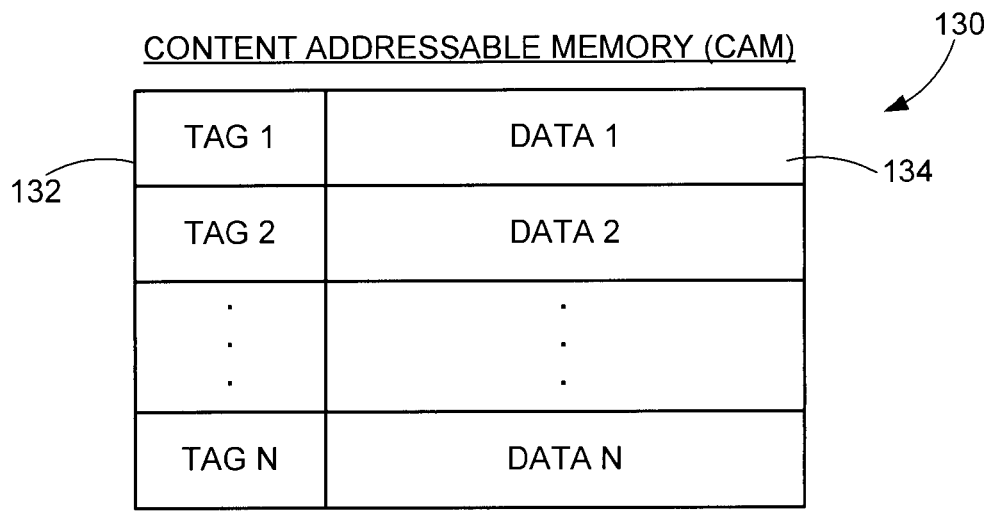
FIG. 3 shows a general format for a content addressable memory (CAM) structure.

FIG. 3 sets forth a generalized format for an associative memory 130 having a content addressable memory (CAM) configuration. CAM based associative memories have found widespread use in a number of applications such as computer system cache, network routers, and various embedded applications.

The memory 130 is arranged to have a number of lines (rows) each with an index field 132 and a word data field 134. The index field 132 stores tag data which serves as an identifier for the associated word data in field 134. The tag data can take any number of desired forms, and can be expressed as a multi-bit value associated with an address of the word data (such as a block address for the word data in another location in memory, such as a logical block address (LBA) associated with the main memory 118).

The memory 130 is accessed during a data retrieval operation by proving input search data which are quickly compared to the tag data in the respective index fields 132. When a match is found, the corresponding word data from the associated word data field 134 is output. Depending on the size and arrangement of the memory 130, the search can be executed over a single clock cycle.

Figure 4:
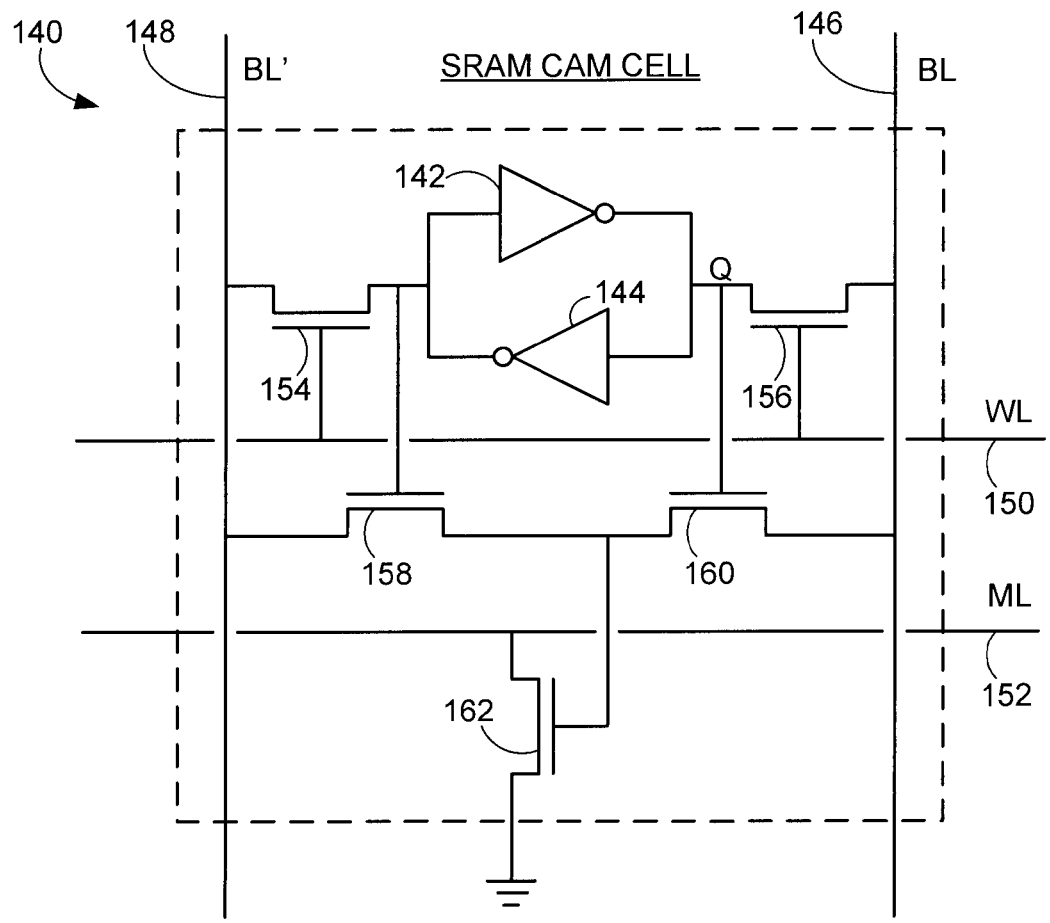
FIG. 4 depicts an SRAM based (CAM) cell.

FIG. 4 provides a schematic depiction of a CAM cell 140. An array of CAM cells such as 140 can be used to store the tag data for the memory 130 in FIG. 3. Each CAM cell 140 is volatile in that it retains a storage bit (Q) substantially only so long as power continues to be applied to the cell.

The exemplary CAM cell 140 in FIG. 4 takes a general nine-transistor (9T) configuration. Five transistors are explicitly shown in FIG. 4, and four additional transistors make up the cross-linked inverters 142, 144. Other configurations for the volatile CAM cell 140 can be readily utilized, including static cell configurations with fewer or greater numbers of transistors or other circuit elements; dynamic configurations that utilize refresh cycles to continuously rewrite the stored value (e.g., DRAM based cells); configurations that utilize one or more capacitors to store charge, etc.

Input lines coupled to the CAM cell 140 in FIG. 4 include two bit lines 146, 148 (denoted BL and BL'), a word line (WL) 150 and a match line (ML) 152. Access transistors 154, 156 are respectively coupled between the inverters 142, 144 and the bit lines BL, BL' 146, 148. The inverters 142, 144 and the transistors 154, 156 take the form of an SRAM memory cell. Switching transistors 158, 160 and 162 selectively couple the cell to the match line ML 152, and are used during search operations.

Writing a state of the CAM cell 140 is carried out in a manner similar to the manner in which data are written to an SRAM cell. This generally involves applying the desired value to the respective bit lines 146, 148 while asserting the word line 150. For example, to write a logical 0 to the CAM cell 140, a 0 (low voltage) is applied to the bit line BL 146 and a 1 (high voltage) is applied to the bit line BL' 148. The word line WL 150 is asserted high to place the access transistors 154, 156 in a conductive state. Responsive to these inputs, the inverters 142, 144 will place the desired value 0 at node Q. Writing a logical 1 to node Q is carried out in similar fashion: the bit line BL 146 is asserted high, the bit line BL' 148 is asserted low, and the word line WL 150 is asserted high.

During a search operation, the ML 152 is asserted high, and input compare data are placed on the bit lines BL, BL' 146, 148. For example, if a bit value of 1 is being searched for in the cell 140, the bit line BL 146 is asserted high and the bit line BL' 148 is asserted low. The word line WL 150 remains unasserted. A mismatch between the searched value and the value stored at node Q will turn on transistor 162, pulling the match line ML 152 low. Contrawise, a match between the searched value and the value stored at Q will retain the match line 152 at its initial high state. An encoder (not shown) senses the respective states of the match lines from the array of CAM cells 140, and can easily identify the specific word data that corresponds to an identified match.

Figure 5:
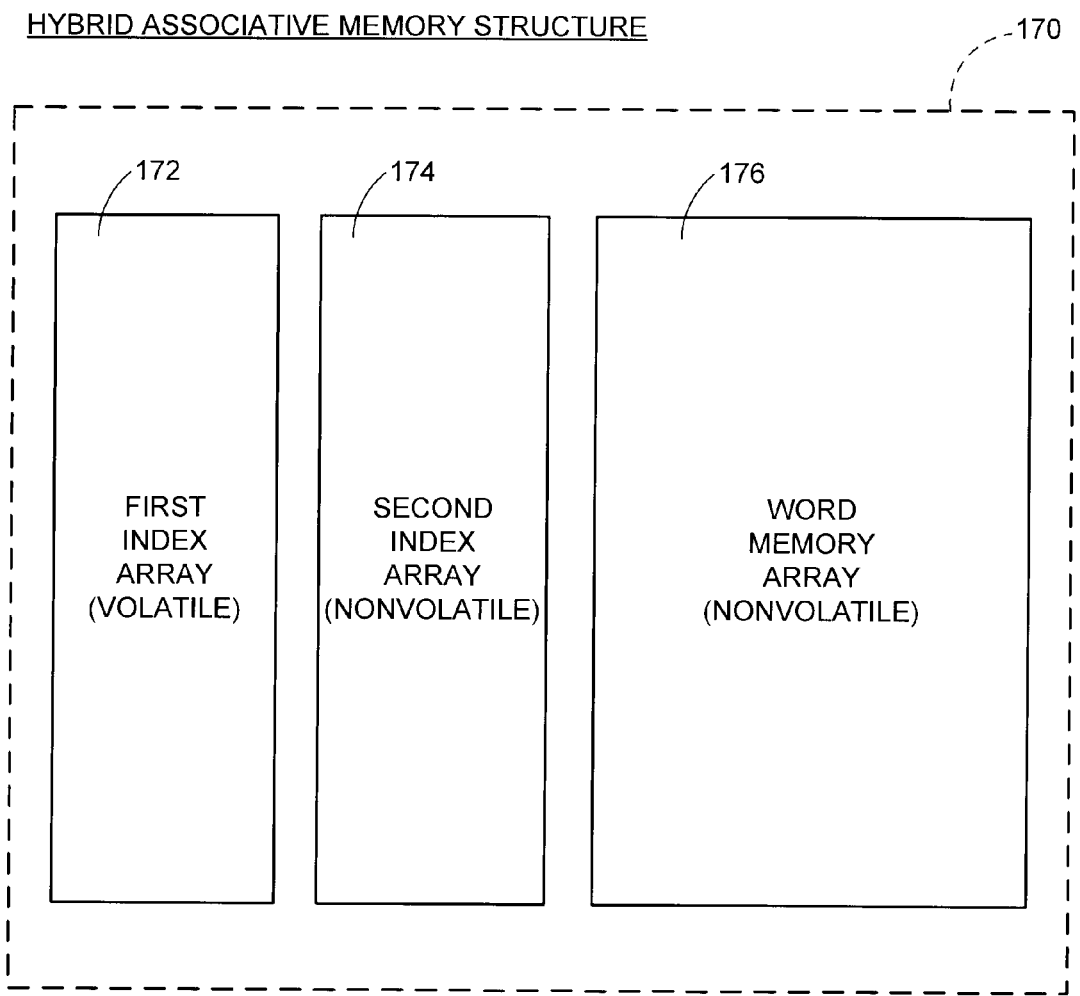
FIG. 5 is a functional representation of a hybrid associative memory device in accordance with various embodiments of the present invention.

FIG. 5 provides a functional representation of a hybrid associative memory structure 170 constructed in accordance with various embodiments of the present invention. The memory structure 170 can represent any number of selected elements of the pipeline structure 110 of FIG. 2, such as but not limited to one of the L1, L2 or L3 caches 120, 122, 124.

The memory structure 170 includes a first index array 172, a second index array 174 and a word memory array 176. In some embodiments, the first index array 172 comprises an array of volatile SRAM based CAM cells as set forth at 140 in FIG. 4. These cells store tag data as shown by the fields 132 in FIG. 3.

In further embodiments, the second index array 174 comprises an array of non-volatile RSM cells, such as STRAM cells or RRAM cells. The second index array 174 provides non-volatile storage of a backup copy of the tag data stored in the first array 172. The word memory array 176 also comprises an array of non-volatile RSM cells, and stores the word data shown by the fields 134 in FIG. 3.

It will be appreciated that additional circuitry can be incorporated into the memory device 170 over that shown in FIG. 5, such as encoding circuitry or access control circuitry, but such are omitted from FIG. 5 for purposes of clarity. Because of the substantially smaller cell size for RSM technology as compared to SRAM technology, the non-volatile second index array 174 will likely have a substantially smaller footprint than the volatile first index array 172. Moreover, while the second index array 174 is shown as a separate functional structure in FIG. 5, it will be appreciated that the second index array 174 can be alternatively combined to form a part of the non-volatile RSM cell array that makes up the word memory array 176.

Figure 6:
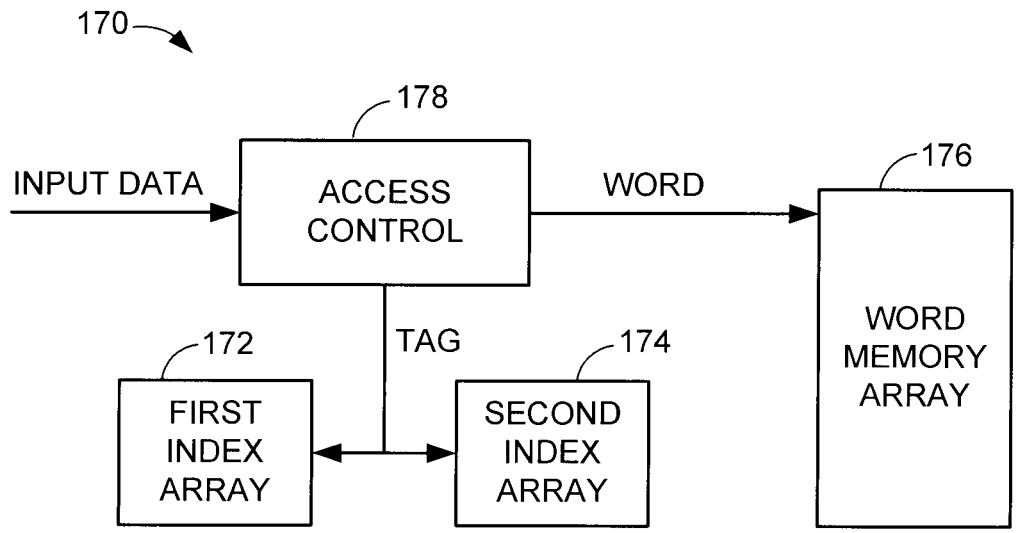
FIG. 6 sets for an exemplary data write operation in which a new data entry is added to the memory device of FIG. 5.

The memory structure 170 combines the advantages of fast CAM searching with non-volatile storage of the tag data. FIG. 6 shows a functional block representation of the memory structure 170 during a write operation in which a new data entry is provided to the memory structure. An access control block 178 directs the writing of tag data to both the first and second index arrays 172, 174, and directs the writing of corresponding word data to the associated line in the non-volatile word memory array 176. The writing of the tag data and the word data can be simultaneous or sequential. In this way, a copy of the contents of the volatile CAM cells 140 in the first array 172 will be maintained in non-volatile storage of the second array 174.

In some embodiments, the word data are placed in the next available line in the word array 176, and the tag data are written to identify the placement of the input word data. The tag data are written to the CAM cells 140 in the first array 172 by asserting the respective bit lines and word lines, such as discussed above with respect to FIG. 4. The tag data are written to the respective RSM cells in the exemplary first array 174 and 176 by applying the appropriate power signal (voltage, spin current, etc.) to orient the resistance state to the desired value.

It is contemplated that the writing of the respective sets of tag data to the two different index arrays 172, 174 can be simultaneous or sequential. In some embodiments, the tag data are written to the non-volatile index array 174 first to ensure no loss of data. When the amount of word data placed into the non-volatile word array 176 is substantially larger than the amount of tag data to be placed into the respective index arrays 172, 174, the writing of the tag data to both index arrays 172. 174 can be carried out in parallel with, and be completed, prior to the completion of the writing of the word data to the non-volatile word array 176. A read/write verify operation may also be carried out on each array, as desired. A write complete signal can be generated by the memory 170 to signify that the writing of data to all three arrays 172, 174 and 176 has been successfully completed.

Figure 7:
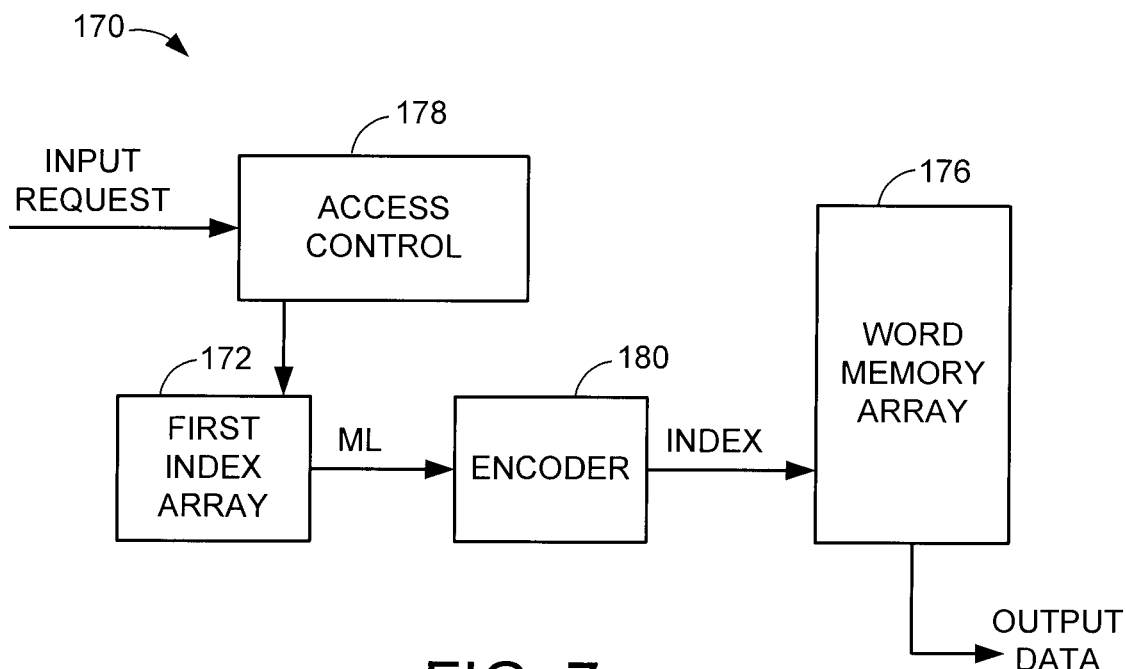
FIG. 7 sets forth an exemplary data retrieval operation during a search of the contents of the memory device of FIG. 5.

FIG. 7 is a functional depiction of the memory structure 170 during a data retrieval operation in which the memory device 170 is searched to determine if requested data are stored therein (i.e., a cache hit). Input request data are supplied to the access control block 178, which carries out a search operation on the first index array 172 such as discussed above with respect to FIG. 4.

In some embodiments, the volatile CAM cells 140 in the first index array 172 are arranged into rows and columns, with each row corresponding to a row of RSM cells in the word memory array 176. The number of columns in the first index array 172 corresponds to the number of tag data bits. A given input request data value is placed on the respective bit lines and concurrently presented to each of the rows of CAM cells 140. If a row of the CAM cells matches the input request value across the bit lines, the match line ML 152 for that row will remain high, and the non-matching rows will have match lines that are all pulled low.

The match lines ML 152 are monitored by an encoder block 180 which, when a match is identified, directs the outputting of the associated word data from the word memory array 176. It will be noted that the second index array 174 is bypassed during the operation of FIG. 7.

Figure 8:
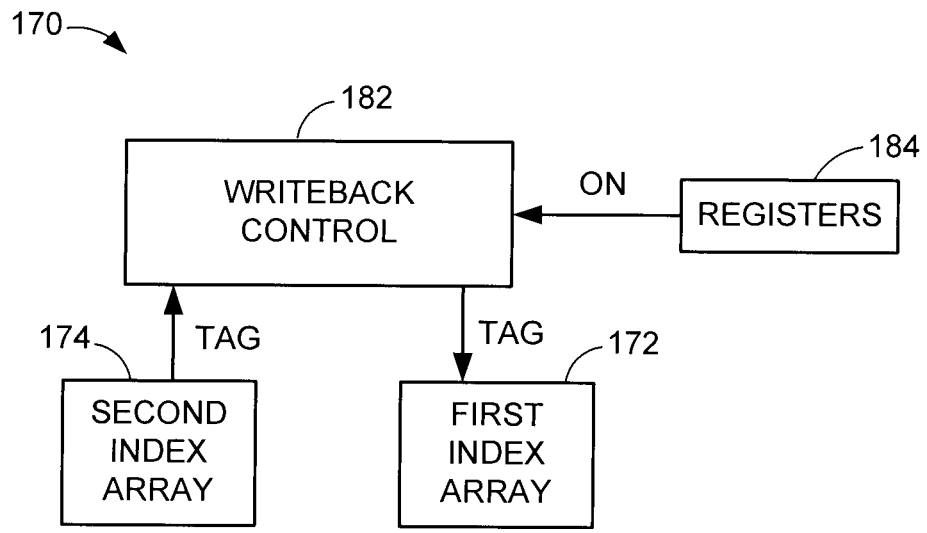
FIG. 8 sets forth an exemplary writeback operation in which tag data are copied from the second index array to the first index array of the memory device of FIG. 5.

FIG. 8 generally depicts a writeback operation after the memory structure 170 has been reinitialized, such as responsive to a power off-on or sleep event. A writeback control block 182 reads the tag data stored in the second index array 174 and copies this data over to the first index array 172. The writeback control block 182 can be enabled by the setting of one or more registers 184. The registers can be configured to be volatile so that, should another reinitialization process be restarted during the copying process, the writeback control block will restart the copying process.

In some embodiments, the second index array 174 is also arranged into a corresponding array of columns and rows of RSM cells to match the columns and rows of CAM cells in the first index array 172. In this way, the RSM cells in the second array 174 can be sequentially read, such as on a row-by-row basis. The sensed contents are placed onto the bit lines of the first array 172, and the row word lines WL are each selected in turn to sequentially copy the tag data from the second array 174 to the first array 172.

Figure 9:
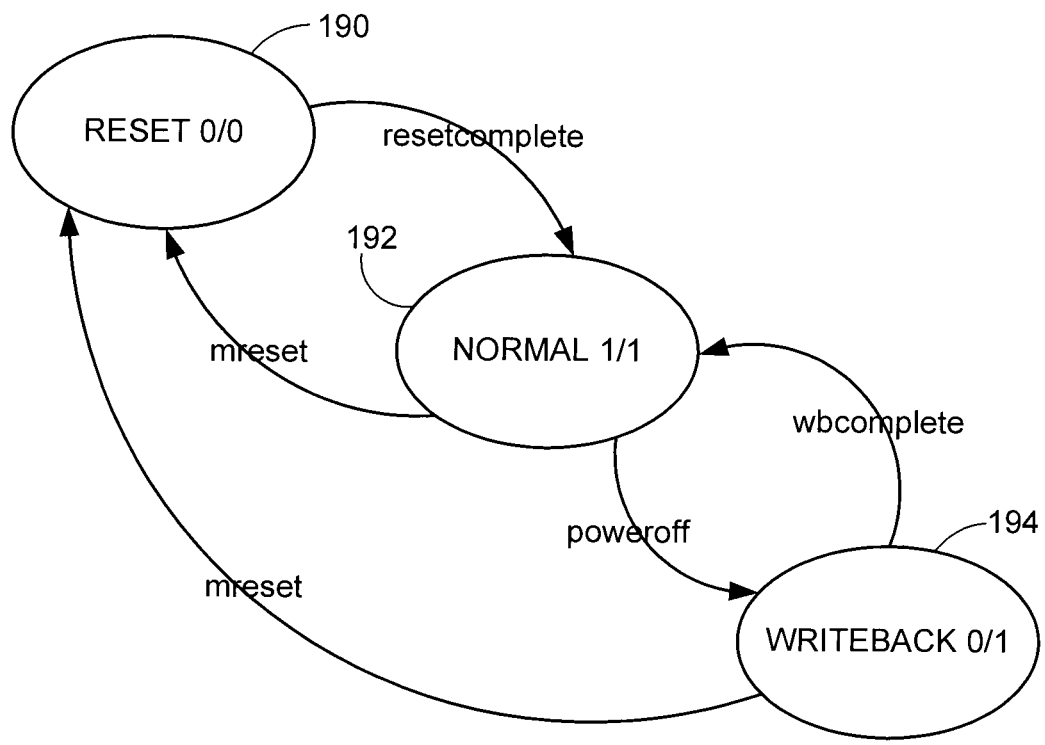
FIG. 9 is a state diagram showing general operation of the memory device of FIG. 5.

FIG. 9 shows the memory structure 170 to be characterized as a state-machine with three states: RESET 190, NORMAL 192 and WRITEBACK 194. During the RESET state, all memory entries are invalidated by turning on invalid bits in both the first and second index arrays 172, 174. When the RESET is completed, the memory structure 170 enters the NORMAL state 192.

In the NORMAL state, normal data writes and reads are carried out to update the structure 170 with new data entries and to output requested data, as set forth above in FIGS. 6-7. When a reinitialization event occurs (such as responsive to a power cycle, etc.), the structure 170 enters the WRITEBACK state 194, where the tag data in the first index array 172 is refreshed by the copying operation as depicted in FIG. 8. The structure 170 can further be configured to enter the RESET state 190 at any time by manually writing data to a dedicated address location in the memory structure, such as a given address in the word memory array 176.

It will now be appreciated that the various embodiments presented herein provide advantages over various prior art structures. Associative memory structures can be provided with the speed of SRAM or similar volatile technologies to provide fast cache searches. Fast access non-volatile RSM memory cells can be used to quickly cache and output the word data, as well as allowing data retention along a pipeline to improve instant-on performance of an overall system.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A memory device comprising:
   a word memory array formed of non-volatile resistive sense memory (RSM) cells;
   a first index array formed of volatile content addressable memory (CAM) cells;
   a second index array formed of non-volatile RSM cells, wherein the memory device is configured as a cache for a non-volatile main memory and operates to output word data from the word memory array during a data retrieval operation when input request data matches tag data stored in the first index array, to write tag data to the first index array and to the second index array during a data storage operation in which word data are written to the word memory array, and to copy the tag data stored in the second index array to the first index array during a device reinitialization operation; and
   a volatile register of at least one volatile memory cell, wherein the memory device is further adapted to initiate a copying process in which the tag data stored in the second index array is output and copied to the first index array responsive to a data value stored in the volatile register established by a loss of power to the volatile register so that the copying process will restart responsive to a subsequent loss of power to the volatile register prior to a conclusion of said copying process.

2. The device of claim 1, wherein the CAM cells of the first index array each comprise a static random access memory (SRAM) based cell with a plurality of transistors, the tag data stored in said CAM cells searched during a single clock cycle.

3. The device of claim 1, wherein the RSM cells of the second index array and the word memory array each comprise a spin-torque transfer random access memory (STRAM) cell.

4. The device of claim 1, wherein the RSM cells of the second index array and the word memory array each comprise a resistive random access memory (RRAM) cell.

5. The device of claim 1, further comprising a writeback block adapted to initiate the copying process responsive to the data value in the volatile register, the writeback block further adapted to alternatively initiate the copying process responsive to a second data value written to a selected address location in the word memory array.

6. The device of claim 1, wherein the memory device writes the tag data to the second index array prior to writing the data to the first index array during the data storage operation.

7. The device of claim 1, wherein the tag data correspond to a logical block address of the associated word data in the word memory array.

8. The device of claim 1, characterized as a cache in a pipeline memory structure of a data storage device with said non-volatile main memory, the cache having an instant-on capability responsive to a power cycle in which power is sequentially removed from and restored to the device so that, at the conclusion of the copying of the tag data from the second index array to the first index array, the pipeline memory structure is in the same state before and after said power cycle.

9. The device of claim 8, wherein the word data stored in the word data memory of the cache comprise data retrieved from the non-volatile main memory.

10. The device of claim 1, wherein a plurality of bit lines and match lines are coupled to the first index array, and wherein the device further comprises an access control block which precharges the match lines and places the input request data on the bit lines to identify a match between the input request data and the tag data stored by the first index array, and wherein the device further comprises an encoder which directs the outputting of the corresponding word data in relation to the match lines.

11. A method comprising:
providing a memory device comprising a word memory array formed of non-volatile resistive sense memory (RSM) cells, a first index array formed of volatile content addressable memory (CAM) cells, and a second index array formed of non-volatile RSM cells;
writing tag data to the second index array prior to writing tag data to the first index array during a data storage operation in which word data are written to the word memory array and said tag data are written to both said first and second index arrays; and
copying tag data stored in the second index array to the first index array during a device reinitialization operation, said copying initiated responsive to a bit value in a volatile register which is set by removing power from the register during a power cycle event, wherein the bit value is set as a result of a loss of power to at least one volatile memory cell during a power cycle event, and wherein the copying process restarts responsive to a second loss of power to the at least one volatile memory cell prior to a conclusion of said copying operation.

12. The method of claim 11, further comprising outputting word data from the word memory array during a data retrieval operation when input request data matches tag data stored in the first index array.

13. The method of claim 12, wherein the outputting step comprises precharging the match lines and placing the input request data on the bit lines to identify a match between the input request data and the tag data stored by the first index array over a single clock cycle, and identifying the corresponding output word data in relation to the match lines.

14. The method of claim 11, wherein the copying step is further initiated responsive to a value written to a selected address location in the word memory array.

15. The method of claim 11, wherein the memory device of the providing step comprises a cache in a pipeline memory structure of a data storage device with a non-volatile main memory, the cache having an instant-on capability responsive to a power cycle in which power is sequentially removed from and restored to the device so that, at the conclusion of the copying of the tag data from the second index array to the first index array, the pipeline memory structure is in the same state before and after said power cycle.

16. An apparatus comprising:
a word memory array formed of non-volatile resistive sense memory (RSM) cells;
a first index array formed of volatile content addressable memory (CAM) cells;
a second index array formed of non-volatile RSM cells;
a register having at least one volatile memory cell; and
a control circuit adapted to output word data from the word memory array during a data retrieval operation when input request data matches tag data stored in the first index array, to write tag data to each of the first and second index arrays during a data storage operation in which word data are written to the word memory array, and to copy the tag data stored in the second index array to the first index array responsive to a data value stored in the at least one volatile memory cell of the register, wherein the data value is set as a result of a loss of power to the at least one volatile memory cell during a power cycle event, and wherein the copying process restarts responsive to a second loss of power to the at least one volatile memory cell prior to a conclusion of said copying operation.

17. The device of claim 16, wherein the CAM cells of the first index array each comprise a static random access memory (SRAM) based cell with a plurality of transistors, the tag data stored in said CAM cells searched during a single clock cycle.

18. The device of claim 16, wherein the control block is further configured to copy the tag data stored in the second index array to the first index array responsive to a second data value stored in a selected address in a non-volatile memory.

19. The device of claim 16, further comprising a non-volatile main memory, wherein the word memory array and the first and second index arrays form a selected cache level in a pipeline memory structure for the main memory, the cache having an instant-on capability responsive to a power cycle in which power is sequentially removed from and restored to the device so that, at the conclusion of the copying of the tag data from the second index array to the first index array, the pipeline memory structure is in the same state before and after said power cycle.

* * * * *

UNITED STATES PATENT AND TRADEMARK OFFICE
CERTIFICATE OF CORRECTION

| | | |
|---|---|---|
| PATENT NO. | : 8,489,801 B2 | Page 1 of 1 |
| APPLICATION NO. | : 12/397569 | |
| DATED | : July 16, 2013 | |
| INVENTOR(S) | : Huang et al. | |

It is certified that error appears in the above-identified patent and that said Letters Patent is hereby corrected as shown below:

On the title page insert item -- (73) Seagate Technology LLC. --

Signed and Sealed this
Eighth Day of October, 2013

Teresa Stanek Rea
*Deputy Director of the United States Patent and Trademark Office*